United States Patent [19]

Yoshino et al.

[11] Patent Number: 4,660,187

[45] Date of Patent: Apr. 21, 1987

[54] LIGHT SIGNAL READING METHOD AND APPARATUS USING INTERFERENCE BETWEEN TWO LIGHT BEAMS OF DIFFERENT FREQUENCY AND POLARIZATION

[75] Inventors: Toshihiko Yoshino, Urayasu; Yasuo Tomita, Yokohama, both of Japan

[73] Assignee: Canon Kabushiki Kaisha, Tokyo, Japan

[21] Appl. No.: 762,448

[22] Filed: Aug. 5, 1985

[30] Foreign Application Priority Data

Aug. 8, 1984 [JP] Japan ................. 59-166254

[51] Int. Cl.$^4$ ................. G11B 11/03; G11B 5/012
[52] U.S. Cl. ................. 369/13; 369/110; 365/122; 360/114; 360/59; 350/371; 364/821
[58] Field of Search ................. 369/13, 14, 110; 365/32, 122; 360/59, 114; 350/371, 375, 376, 378, DIG. 3, 358; 364/821, 822

[56] References Cited

U.S. PATENT DOCUMENTS

| 4,124,280 | 11/1978 | Berg et al. | 364/822 |
| 4,409,631 | 10/1983 | Matsumoto | 360/114 |
| 4,448,494 | 5/1984 | Freyre | 350/371 |
| 4,531,196 | 7/1985 | Lin | 364/822 |
| 4,542,492 | 9/1985 | Leterme et al. | 369/110 |
| 4,558,440 | 12/1985 | Tomita | 369/110 |
| 4,602,852 | 7/1986 | Moroz | 364/822 |
| 4,607,359 | 8/1986 | Matsubayashi et al. | 369/110 |

OTHER PUBLICATIONS

Berg et al., "Acousto Optical Signal Processing", 1983, pp. 8-13.

Primary Examiner—Raymond F. Cardillo
Assistant Examiner—Hoa T. Nguyen
Attorney, Agent, or Firm—Fitzpatrick, Cella, Harper & Scinto

[57] ABSTRACT

A light signal reading method in which a first light beam modulated to a polarized state in accordance with information magnetically recorded on a recording medium is caused to interfere with a second light beam of a frequency different from that of the first light beam, and the information being detected as a variation in the intensity of the interference light, and an apparatus therefor.

19 Claims, 9 Drawing Figures

LIGHT SIGNAL READING METHOD AND APPARATUS USING INTERFERENCE BETWEEN TWO LIGHT BEAMS OF DIFFERENT FREQUENCY AND POLARIZATION

BACKGROUND OF THE INVENTION

1. Field of the Invention

This invention relates to a light signal reading method used when information is optically reproduced from a recording medium on which the information is magnetically recorded, and an apparatus therefor.

2. Description of the Prior Art

In recent years, in the field of high density recording of information, the opto-magnetic recording system using the magneto-optical effect and capable of rewriting has been regarded as being promising instead of the fixed information type recording system using a so-called optical disc or the like.

Heretofore, a reading optical system as shown in FIG. 1A of the accompanying drawings has generally been used for the reproduction of the opto-magnetic record as described above. A parallel light beam 1 emitted from a light source (not shown) such as a semiconductor laser is made into a light beam linearly polarized in a certain direction by a polarizer 2, passes through a beam splitter 3 and an objective lens 4 and enters a magnetic film 5 while assuming the form of a spot. The magnetic film 5 is formed on a substrate 9 of glass or resin by a technique such as sputtering, and information is recorded thereon as a variation in the direction of magnetization of the magnetic film. The light beam 1 which has entered the magnetic film 5 is reflected with its plane of polarization rotated in opposite directions by the magneto-optical kerr effect correspondingly to the direction of magnetization of the magnetic film 5. For example, assuming that the plane of polarization of the light beam reflected by a downwardly facing magnetized area is subjected to a rotation of $\theta K$, the plane of polarization of the light beam reflected by an upwardly facing magnetized area is subjected to a rotation of $-\theta K$.

Now, where the above-mentioned incident light beam 1 is S-polarized light as shown in FIG. 1B of the accompanying drawings, if the direction of transmission of polarized light through an analyser 6 is disposed in a direction (Q direction) perpendicular to the above-mentioned direction of polarization $-\theta K$, the reflected light from the upwardly facing magnetized area is intercepted by the analyser 6 and only the reflected light from the downwardly facing magnetized area is detected by a photodetector 8 with only the amplitude component in the direction of transmission of polarized light transmitted through the analyser 6 being passed through a condensing lens 7, whereby the information magnetically recorded on the magnetic film 5 can be digitally read.

However, the kerr rotation angle $\theta K$ by the magneto-optical Kerr effect is a minute angle of the order of 0.1° and moreover, the power of the reproducing light must be made low so as not to erase the magnetically recorded information on the magnetic film, and the transmitted signal component from the analyser 6 is very minute. Therefore, for example, where an ordinary PIN photodiode or the like is employed as the photodetector 8, heat noise becomes dominant and deterioration of the signal to noise ratio (S/N ratio) for reproduction has become a problem. Also, where an avalanche photodiode (hereinafter referred to as the APD) having an internal increasing action is used for photodetection, an increase in signal power can be achieved by increasing the increase rate until the shot noise becomes equal to or greater than the heat noise, but sufficient improvement of the S/N ratio could not be achieved due to the increase noise peculiar to the APD. Further, means for eliminating the instability of the increase rate of the APD is necessary, and this has led to a disadvantage that the construction becomes complicated.

SUMMARY OF THE INVENTION

It is an object of the present invention to eliminate the above-noted disadvantages and to provide a light signal reading method and apparatus in which a high reproduction S/N ratio is obtained as compared with the prior art even if the magneto-optical effect is used.

It is another object of the present invention to provide a light signal reading method and apparatus in which a relatively high reproduction S/N ratio is obtained and which is simple in operation and construction.

The above objects of the present invention are achieved by a light signal reading method and apparatus based on the principle that a first light beam modulated to a polarized state in accordance with information magnetically recorded on a recording medium is caused to interfere with a second light beam of a frequency different from that of said first light beam and said information is detected as a variation in the intensity of the interference light.

DESCRIPTION OF THE PREFERRED EMBODIMENTS

Figure 1A:
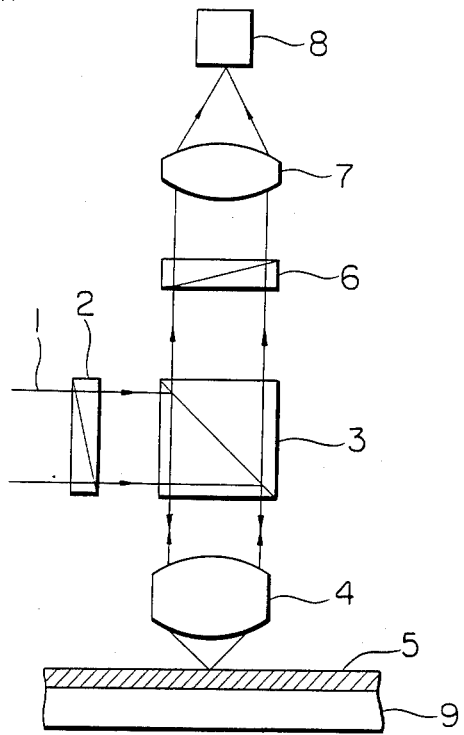
FIGS. 1A and 1B show the construction of the light signal reading apparatus according to the prior art and the principle of reading, respectively.
Figure 1B:
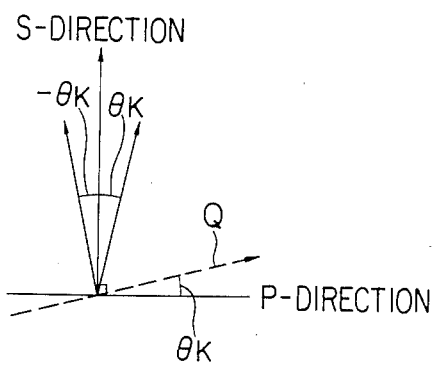
Figure 2:
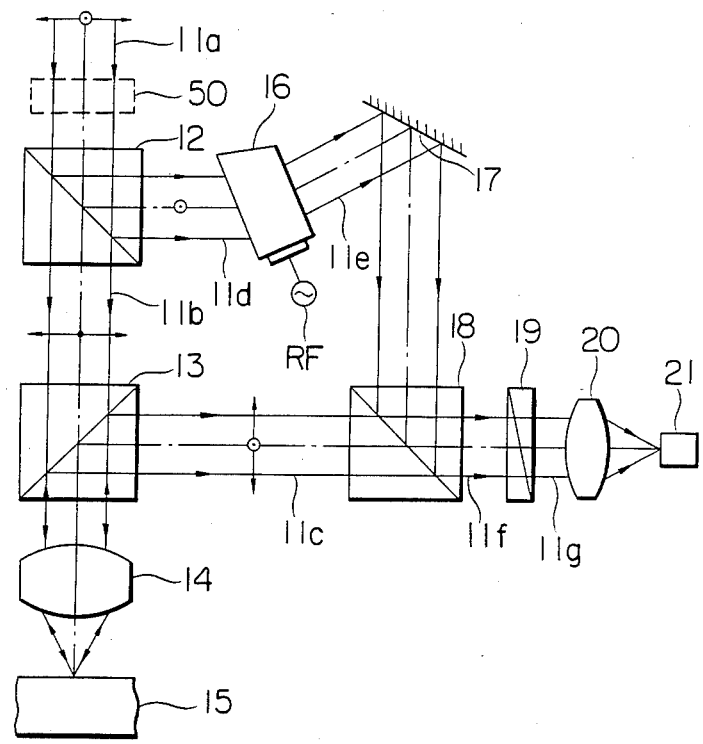
FIG. 2 schematically shows the construction of a first embodiment of the light signal reading apparatus according to the present invention.

Referring to FIG. 2 which schematically shows the construction of a first embodiment of the light signal reading apparatus according to the present invention, reference characters 11a–11g designate light beams, and reference numeral 12 denotes a polarizing beam splitter in which the reflectance of S-polarized light (in FIG. 2, having a plane of polarization perpendicular to the plane of the drawing sheet) and the transmittance of P-polarized light (in FIG. 2, having a plane of polarization parallel to the plane of the drawing sheet) are set so as to amplitude-divide the light beam 11a from a light source such as a semiconductor laser into two light beams 11b and 11d at an appropriate ratio of quantity of light. Reference numeral 13 designates a beam splitter, reference numeral 14 denotes an objective lens, reference numeral 15 designates a recording medium having a magnetic film on which information is magnetically recorded, reference numeral 16 denotes a frequency shifter, reference numeral 17 designates a reflecting mirror, reference numeral 18 denotes a beam splitter, reference numeral 19 designates an analyser, reference numeral 20 denotes a condensing lens and reference numeral 21 designates a photodetector.

Operation of the apparatus shown in FIG. 2 will now be described. The light beam 11a emitted from a light source (not shown) such as a laser is divided into a P-polarized light beam 11b and an S-polarized light beam 11d at a suitable intensity division ratio by the polarizing beam splitter 12. One light beam 11b is transmitted through the beam splitter 13, is condensed on the recording medium 15 by the objective lens 14 and is reflected as a modulated light whose state of polarization has been varied in accordance with the recorded information on the recording medium 15. At that time, as already described in connection with the prior art, a polarized light component (S-polarized light) orthogonal to the polarization direction (P-polarized light) of the light beam 11b is created by the magneto-optical Kerr effect, and the polarization direction of the reflected light is rotated by $+\theta K$ or $-\theta K$ from the P-direction correspondingly to the direction of magnetization of the magnetized area on the recording medium 15. If, with regard to the reflected light of the light beam 11b from the recording medium 15, the Fresnel reflection coefficient concerned in P-polarized light is $r = |r|e^{i\delta_r}$ and the Kerr reflection coefficient concerned in S-polarized light by the magneto-optical Kerr effect is $K = |K|e^{i\delta_K}$, the above-mentioned Kerr rotation angle $+\theta K$ or $-\theta K$ is represented by the following equation ($\delta_r$ and $\delta_K$ representing the variations in phase by reflection):

$$\pm\theta K = \tfrac{1}{2}\tan^{-1}[\tan 2\alpha \cos \delta^{(\pm)}] \qquad (1)$$

where $$\alpha = \tan^{-1}(|K/r|)$$

$$\delta^{(\pm)} = \begin{cases} \delta_K - \delta_r : (+) \\ \delta_K - \delta_r + \pi : (-) \end{cases}$$

Figure 3:
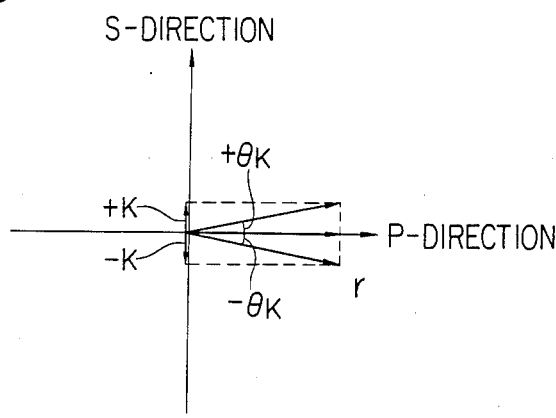
FIG. 3 illustrates the rotation of the plane of polarization by the magneto-optical effect.

That is, as shown in FIG. 3, the Kerr rotation angles $+\theta K$ and $-\theta K$ are created by the Kerr reflection coefficient becoming K and $-K$ in accordance with the direction of magnetization. The reflected light from the recording medium 15 having its state of polarization modulated in this manner by the recording medium 15 again passes through the objective lens 14, is reflected by the beam splitter 13 and is transmitted through the beam splitter 18 as a light beam 11c including both of P-polarized light and S-polarized light.

On the other hand, the S-polarized light beam 11d reflected by the polarizing beam splitter 12 enters the frequency shifter 16. This frequency shifter 16 comprises, for example, an ultrasonic wave cell or the like and has the function of shifting the frequency f of the light beam 11d (which is the same as the frequency of the light beam 11b) by $\Delta f$. The light beam 11e thus made to have the frequency $f+\Delta f$ is reflected by the beam splitter 18 through the intermediary of the reflecting mirror 17 and interferes with the aforementioned light beam 11c due to optical mixing. The light beam 11f of this interference light is made into an S-polarized light beam 11g by the analyser 19 and is detected by the photodetector 21 through the condensing lens 20.

Figure 4A:
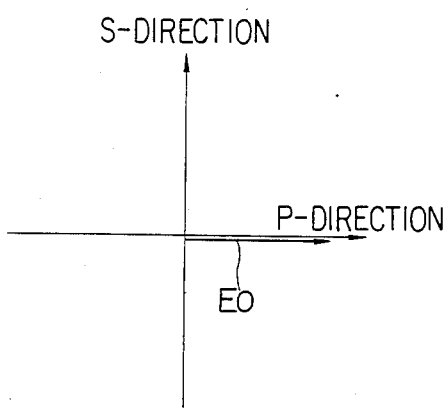
FIGS. 4A to 4D illustrate the principle of the light signal reading method by the apparatus of FIG. 2.
Figure 4B:
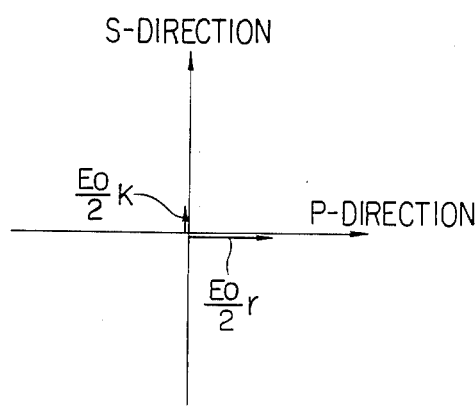

FIGS. 4A to 4D illustrate the principle of signal detection in the above-described light signal reading method or operation. Assuming that the polarizing beam splitter 12 transmits almost all of P-polarized light therethrough and reflects almost all of S-polarized light, most of the component of the transmitted light beam 11b is P-polarized light and most of the component of the reflected light beam 11d is S-polarized light. Accordingly, as shown in FIG. 4A, the light beam 11b transmitted through the beam splitter 13 has a P-polarized amplitude component $E_o$, whereas the light beam 11c reflected by the recording medium 15 and subjected to modulation has a P-polarized component $(E_o/2)r$ and an S-polarized component $(E_o/2)K$ as shown in FIG. 4B. However, it is to be understood that the beam splitter 13 is a half-mirror which does not absorb light and does not have the polarizing characteristic and that the transmitted or reflected output amplitude component thereof is $1/\sqrt{2}$ times the input component.

Figure 4C:
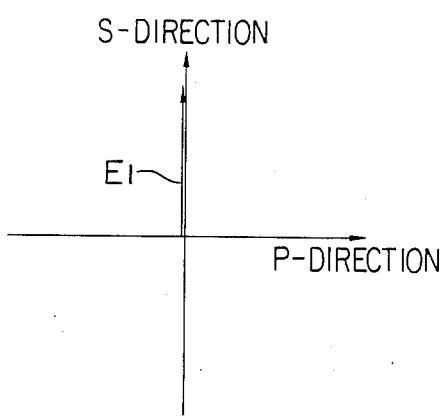
Figure 4D:
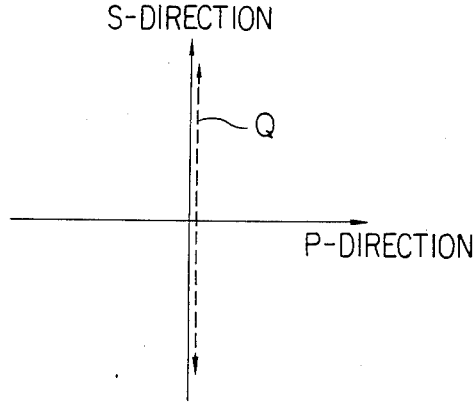

On the other hand, the light beam 11d reflected by the polarizing beam splitter 12 has an S-polarized amplitude component $E_1$ as shown in FIG. 4C and is made into an S-polarized light beam 11e of the frequency $f+\Delta f$ by the frequency shifter 16. As previously described, these light beams 11c and 11e are optically mixed by the beam splitter 18 and become a light beam 11f, which enters the analyser 19 whose transmission axis direction Q is coincident with S-direction as shown in FIG. 4D. The light beam 11g transmitted through this analyser 19 is photoelectrically converted by the photodetector 21 and the variation in the intensity of the interference light is detected as information, and the then intensity I of detected light is expressed as the following equation:

$$I = |E_1'e^{i2\pi(f+\Delta f)t} + \tfrac{1}{2}E_o'Ke^{i2\pi ft}|^2 \qquad (2)$$

$$= |E_1'| \; |E_o'| \; |K| \cos(2\pi\Delta ft - \delta_K - \phi)$$

However, it is to be understood that the beam splitter 18 is a half-mirror similar to the beam splitter 13 and the output amplitude components thereof are $E'_o = E_o/\sqrt{2}$ and $E'_1 = E_1/\sqrt{2}$. Also, as previously mentioned, $K = |K|e^{i\delta_K}$ and the phase $\delta_K$ is varied by $\pi$ by the inversion of magnetization of the recording medium 15. Accordingly, the information of the inversion of magnetization can be discriminated as the inversion of the sign of the last term of the right side of equation (2). $\phi$ is an amount corresponding to the bias phase. The foregoing description of the operation is also the description of the light signal reading method of detecting information as a variation in the intensity of interference light.

If, in the embodiment of FIG. 2, the ratio of intensity between the light beam 11b and the light beam 11d is preset so that $|E_1|^2 > |E_o|^2$ by providing a suitable polarizing element 50 (indicated by broken line in FIG. 2) in the light beam 11a or rotating the beam splitter 12, equation (2) can be approximated by the following formula with $|K|^2 \ll 1$ being taken into account:

$$I \approx \tfrac{1}{2}[P_1 + \sqrt{P_1 P_o}|K| \cos(2\pi\Delta ft - \delta_K - \phi)] \qquad (3)$$

where $P_1 = |E_1|^2$ is the power of the light beam 11d and $P_o = |E_o|^2$ is the power of the light beam 11b. From formula (3), it follows that in the DC component Idc of the reproduced signal, the power of the light beam 11d which is the first term of the right side is dominant and the AC component Iac including the magnetic information of the recording medium 15 is represented by the second term as the beat signal by the frequency shift $\Delta f$ by the frequency shifter 16.

Thus, in the light signal reading method or operation by the above-described embodiment, detection in which shot noise is dominant can be realized by increasing the power $P_1$ of the light beam 11d and moreover, detection of alternating current can be easily accomplished by setting the amount of frequency shift $\Delta f$ by the frequency shifter 16 to the order of several tens of MHz. Accordingly, even in a case where a PIN photodiode or the like having no internal increasing action is employed as the photodetector, the S/N ratio can be improved to the shot noise limit. Also, the light beam 11d having its power $P_1$ increased is not applied to the recording medium 15 and therefore, the recorded information is never erased by mistake. Further, the above-described embodiment is theoretically the optical heterodyne detection system using optical mixing, and effects the detection of alternating current in the form of the detection signal being modulated by the beat frequency $\Delta f$ and can therefore eliminate various noise factors which have posed problems in the detection of alternating current according to the prior art.

Figure 5:
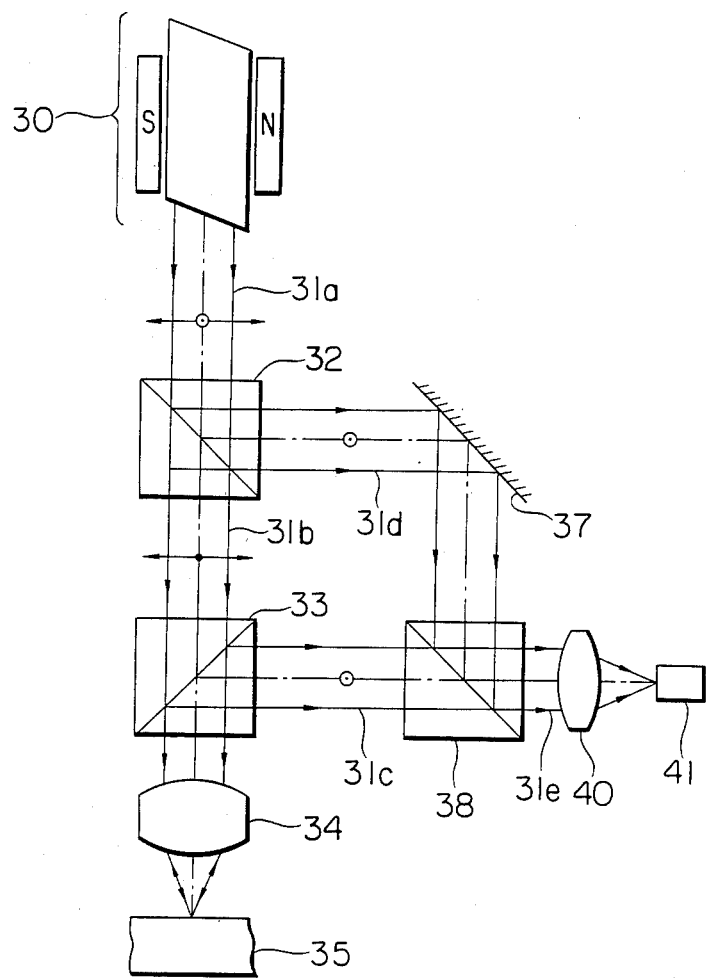
FIG. 5 schematically shows the construction of a second embodiment of the light signal reading apparatus according to the present invention.

FIG. 5 schematically shows the construction of a second embodiment of the light signal reading apparatus according to the present invention. In FIG. 5, reference numeral 30 designates a transverse magnetic field type Zeeman laser which utilizes the Zeeman effect to emit a light of two frequencies $f_1$ and $f_2$ in which the directions of polarization are orthogonal to each other. This light beam 31a of two frequencies is divided into a P-polarized light beam 31b of frequency $f_1$ and an S-polarized light beam 31d of frequency $f_2$ by a polarizing beam splitter 32. One light beam 31b is transmitted through a polarizing beam splitter 33 so set as to transmit almost all of P-polarized light therethrough and reflect almost all of S-polarized light, and is condensed on a recording medium 35 on which information is magnetically recorded, by an objective lens 34. The reflected light by the recording medium 35, as in the first embodiment, has its plane of polarization rotated in accordance with the direction of magnetization, and again enters the polarizing beam splitter 33, whereby only the S-polarized light which is the component of Kerr reflection coefficient K (the information signal component) is selectively reflected and becomes a light beam 31c. The other light beam 31d is reflected by a reflecting mirror 37, is reflected by a beam splitter 38 which is a half-mirror, and interferes with the light beam 31c due to optical mixing. This interference light 31e is detected by a photodetector 41 through a condensing lens 40.

In the embodiment shown in FIG. 5, the principle of signal detection is similar to that in the first embodiment and therefore need not be described in detail, but the AC component including the recorded information is detected as the beat signal by the frequency difference $|f_1-f_2|$ between the aforementioned two light beams. Also, by increasing the power of the light beam 31d, the S/N ratio in signal reproduction can be improved as in the first embodiment.

In the second embodiment, use is made of a laser light source which emits a two-frequency linearly polarized light whose directions of polarization are orthogonal to each other and therefore, the frequency shifter in the first embodiment need not be used. Also, by extracting only the modulated component which is an information signal component by the polarizing beam splitter 33, the analyser can be eliminated and thus, the construction becomes simpler.

The present invention is not limited to the above-described embodiments, but various modifications thereof are possible. For example, the frequency shifter 16 is not limited to an ultrasonic wave cell, but may also be mechanical frequency shifting means such as a rotational grating or a rotation phase plate, or a rotator using electro-optical crystal such as $LiNbO_3$. Also, in the embodiments, the signal reading by the reflected light from the recording medium has been shown, but the present invention is also applicable to the light signal reading by the light transmitted through the recording medium which utilizes the Faraday effect.

As described above, the present invention has the effect of causing a light beam subjected to modulation by the recording medium to interfere with a light beam different therefrom and effecting reading of information, thereby increasing the power of the signal light and greatly improving the reproduction S/N ratio without increasing the risk of erroneous erasing of recorded information.

What we claim is:

1. A light signal reading method comprising the steps of:
    producing a first light beam having a first predetermined polarization and a first predetermined frequency;
    producing a second light beam having a second predetermined polarization and a second predetermined frequency which is different from said first frequency;
    interacting the first light beam with information magnetically recorded on a recording medium to cause the first light beam to include an information signal component which carries that information;
    causing at least the information signal component of the first light beam to interfere with the second light beam;
    and detecting the information as a variation in the intensity of the interference light.

2. A light signal reading method according to claim 1, wherein said first light beam is obtained as one of two light beams whose direction of polarization are orthogonal to each other through means for dividing a light beam from a light source into said two light beam, and said second light beam is obtained by the other of said two light beams having its frequency shifted by means for shifting the frequency of the light beam.

3. A light signal reading method according to claim 1, wherein said first and second light beams are obtained through means for dividing a light beam from a laser light source emitting a two-frequency linearly polarized light whose directions of polarization are orthogonal to each other into two light beams according to the directions of polarization.

4. A light signal reading method according to claim 1, wherein the power of said second light beam is increased more than the power of said first light beam.

5. A light signal reading method according to claim 1, wherein the difference between the frequencies of said first and second light beams is about several tens of MHz.

6. A light signal reading method according to claim 1, wherein said first and second light beams are caused to interfere with each other due to optical mixing.

7. A light signal reading apparatus comprising:

light beam emitting means emitting first and second light beams different in direction of polarization and different in frequency;

means for applying said first light beam to a recording medium on which information is magnetically recorded;

interference means for causing at least the information signal component of said first light beam modulated to a polarized state in accordance with said information to interfere with said second light beam and obtaining an interference light; and means for detecting the intensity of said interference light.

8. A light signal reading apparatus according to claim 7, wherein said light beam emitting means comprises a light source, means for dividing the light beam from said light source into two light beams whose directions of polarization are orthogonal to each other and emitting one of said two light beams as said first light beam, and frequency shifting means for shifting the frequency of the other of said two light beams and emitting said second light beam.

9. A light signal reading apparatus according to claim 7, wherein said light beam emitting means comprises a laser light source emitting a two-frequency linearly polarized light whose directions of polarization are orthogonal to each other, and means for dividing the light beam from said laser light source into said first and second light beams in accordance with the directions of polarization.

10. A light signal reading apparatus according to claim 7, further comprising means for making the power of said second light beam greater than the power of said first light beam.

11. A light signal reading apparatus according to claim 7, wherein the difference between the frequencies of said first and second light beams it set to about several tens of MHz.

12. A light signal reading apparatus according to claim 7, wherein said first and second light beams are caused to interfere with each other in said interference means due to optical mixing.

13. A light signal reading apparatus according to claim 7, further comprising selecting means for selectively taking out only the information signal component from said first light beam modulated to a polarized state in accordance with said information and directing the same to said interference means.

14. A light signal reading apparatus according to claim 7, further comprising selecting means for selecting from said interference light only the interference light component brought about by the interference of said modulated first light beam with the information signal component and directing the same to said detecting means.

15. A light signal reading apparatus according to claim 8, wherein said frequency shifting means comprises an ultrasonic wave cell.

16. A light signal reading apparatus according to claim 9, wherein said laser light source comprises a transverse magnetic field type Zeeman laser.

17. A light signal reading apparatus according to claim 12, wherein said interference means comprises a half-mirror which does not absorb light and does not have the polarizing characteristic.

18. A light signal reading apparatus according to claim 13, wherein said selecting means comprises a polarizing beam splitter.

19. A light signal reading apparatus according to claim 14, wherein said selecting means comprises an analyser.

* * * * *

UNITED STATES PATENT AND TRADEMARK OFFICE
CERTIFICATE OF CORRECTION

PATENT NO. : 4,660,187
DATED : April 21, 1987
INVENTOR(S) : TOSHIHIKO YOSHINO ET AL.

Page 1 of 2

It is certified that error appears in the above-identified patent and that said Letters Patent is hereby corrected as shown below:

AT [56] OTHER PUBLICATIONS

"Acousto Optical" should read --"Acousto-Optical--.

COLUMN 1

Line 35, "kerr" should read --Kerr--.
Line 58, "kerr" should read --Kerr--.

COLUMN 3

Line 14, "a" should read --a beam of--.
Line 53, delete "of".

COLUMN 4

Line 28, "with S-direction" should read --with the S-direction--.

COLUMN 5

Line 41, "reflected light" should read --light reflected--.

COLUMN 6

Line 10, "using" should read --using an--.
Line 11, "the embodiments," should read --the illustrated embodiments.--
Line 13, Delete "the" (second occurrence).
Line 14, "by the" should read --using--.
Line 45, "direction" should read --directions--.
Line 47, "beam," should read --beams,--.

UNITED STATES PATENT AND TRADEMARK OFFICE
CERTIFICATE OF CORRECTION

PATENT NO. : 4,660,187

DATED : April 21, 1987

INVENTOR(S) : TOSHIHIKO YOSHINO ET AL.

It is certified that error appears in the above-identified patent and that said Letters Patent is hereby corrected as shown below:

COLUMN 8

Line 1, "it" should read --is--.

Signed and Sealed this

Twenty-fifth Day of August, 1987

Attest:

Attesting Officer

DONALD J. QUIGG

Commissioner of Patents and Trademarks